Patented Feb. 4, 1941

2,230,697

UNITED STATES PATENT OFFICE 2,230,697

CASING

George Prytikin, Chicago, Ill.

No Drawing. Application May 20, 1939,
Serial No. 274,787

3 Claims. (Cl. 99—176)

The invention relates to casings for edible products and, more particularly, to sausage casings and the method of producing the same.

It is an object of the invention to produce a casing from inexpensive material which, in all respects, meets the requirements of a sausage casing as to heat resistancy, water tightness, and possesses adaptability to conform to the reduced sizes of the sausage occasioned by shrinking.

A further object constitutes the provision of a method whereby ordinary paper, free of resin, may be utilized to provide a satisfactory casing.

Another object is the provision of an artificial casing which is watertight, but is not impervious to air so that no deterioration of the filler in the casing occurs.

A still further object constitutes the provision of a casing made of paper which is more pliant and flexible than any other casing hitherto produced.

Other and equally important objects will become apparent from a perusal of the invention, which comprises the steps of a novel method described in the following specification, and particularly pointed out in the claims forming a part thereof.

In carrying out my invention, gelatine is dissolved in water which has been heated to a temperature of about 180° F.

In a separate container casein is introduced in water heated to a temperature of about 180° F.

The two solutions are mixed while in hot condition to provide a bath for impregnating a cellulose product such as ordinary paper free from resin. To this end, the paper is immersed in the mixture and subsequently hardened by insertion in a six percent solution of formaldehyde.

The treated paper is resistant to heat up to a temperature of 180° F., is watertight but pervious to air to permit circulation thereof, is pliant and flexible and adapts itself to the contour of the filler, to cling thereto even though its size is reduced by shrinkage.

An example of the quantities of ingredients employed for the impregnating mixture is as follows:

12 lbs. of gelatine are dissolved in
84 lbs. of water.
½ lb. of casein, dissolved in about
3½ lbs. of water.

The paper is immersed in the mixture and subsequently hardened by insertion in a six percent solution of formaldehyde.

While the specification describes the steps of a novel method for producing artificial casings, and particular ingredients employed for the impregnating mixture, numerous changes and alterations may be made without departing from the spirit of the invention.

I, therefore, do not limit myself to the sequence of the steps as recited nor the particular ingredients mentioned, but claim my invention as broadly as the state of the art permits.

I claim:

1. A casing comprising a paper free from resin impregnated with a solution of gelatine and casein, and subjected to hardening.

2. A casing comprising a strip of paper free from resin impregnated with a solution of gelatine and casein, and subjected to the influence of a formaldehyde solution.

3. A casing comprising a paper free from resin impregnated with a solution of gelatine and casein, and subjected to hardening, said solution containing gelatine and casein in the proportion of 24 to 1.

GEORGE PRYTIKIN.